United States Patent
Thompson et al.

(10) Patent No.: US 7,556,849 B2
(45) Date of Patent: Jul. 7, 2009

(54) LOW ODOR FACED INSULATION ASSEMBLY

(75) Inventors: Gerald L. Thompson, Moseley, VA (US); Anthony E. Moore, Glen Allen, VA (US); Timothy D. Logsdon, Mechanicsville, VA (US); Ralph Michael Fay, Lakewood, CA (US)

(73) Assignee: Johns Manville, Denver, CO (US)

( * ) Notice: Subject to any disclaimer, the term of this patent is extended or adjusted under 35 U.S.C. 154(b) by 170 days.

(21) Appl. No.: 10/808,942

(22) Filed: Mar. 25, 2004

(65) Prior Publication Data

US 2005/0223668 A1    Oct. 13, 2005

(51) Int. Cl.
*F16L 11/04* (2006.01)
*B65D 65/28* (2006.01)
*B32B 1/04* (2006.01)
*B32B 1/06* (2006.01)
*B32B 3/02* (2006.01)
*B32B 3/30* (2006.01)
*E04B 1/00* (2006.01)
*E04B 1/74* (2006.01)

(52) U.S. Cl. .................. 428/36.9; 428/43; 428/74; 428/167; 52/98; 52/404.1

(58) Field of Classification Search ............... 428/36.9, 428/68, 71, 74, 43, 126, 167, 907; 52/98, 52/406.2, 407.3, 407.4, 404.1, 408
See application file for complete search history.

(56) References Cited

U.S. PATENT DOCUMENTS

| | | | | |
|---|---|---|---|---|
| 2,280,460 | A | * | 4/1942 | Voigt et al. ................. 156/391 |
| 2,496,566 | A | * | 2/1950 | Szwarc ....................... 428/491 |
| 3,140,220 | A | * | 7/1964 | Walter ........................ 428/126 |
| 3,222,243 | A | * | 12/1965 | Gaston et al. ............... 428/138 |
| 5,271,767 | A | | 12/1993 | Light, Sr. et al. |
| 6,331,350 | B1 | | 12/2001 | Taylor et al. |
| 6,461,421 | B1 | | 10/2002 | Ronvak |
| 7,037,955 | B2 | * | 5/2006 | Timcik et al. ............... 523/102 |
| 2001/0030018 | A1 | * | 10/2001 | Weinstein et al. ........... 156/257 |
| 2004/0163724 | A1 | * | 8/2004 | Trabbold et al. ............ 138/149 |
| 2004/0166087 | A1 | * | 8/2004 | Gembala .................... 424/76.1 |
| 2005/0170721 | A1 | * | 8/2005 | Toas et al. ................... 442/149 |

* cited by examiner

*Primary Examiner*—Rena L Dye
*Assistant Examiner*—Walter B Aughenbaugh
(74) *Attorney, Agent, or Firm*—Robert D. Touslee

(57) ABSTRACT

A faced fibrous insulation assembly includes: a fibrous insulation blanket whose fibers, preferably, are bonded together with a formaldehyde free binder; a facing formed by a kraft paper sheet material; and an asphalt coating layer on the inner surface of the facing that bonds the facing to the fibrous insulation blanket. The asphalt coating layer contains an odor-reducing additive in an amount sufficient to substantially eliminate odor that would otherwise be emitted by the asphalt coating layer without adversely affecting the adherent qualities of the asphalt coating layer. Preferably, the facing and the asphalt coating layer are fungi growth resistant.

11 Claims, 2 Drawing Sheets

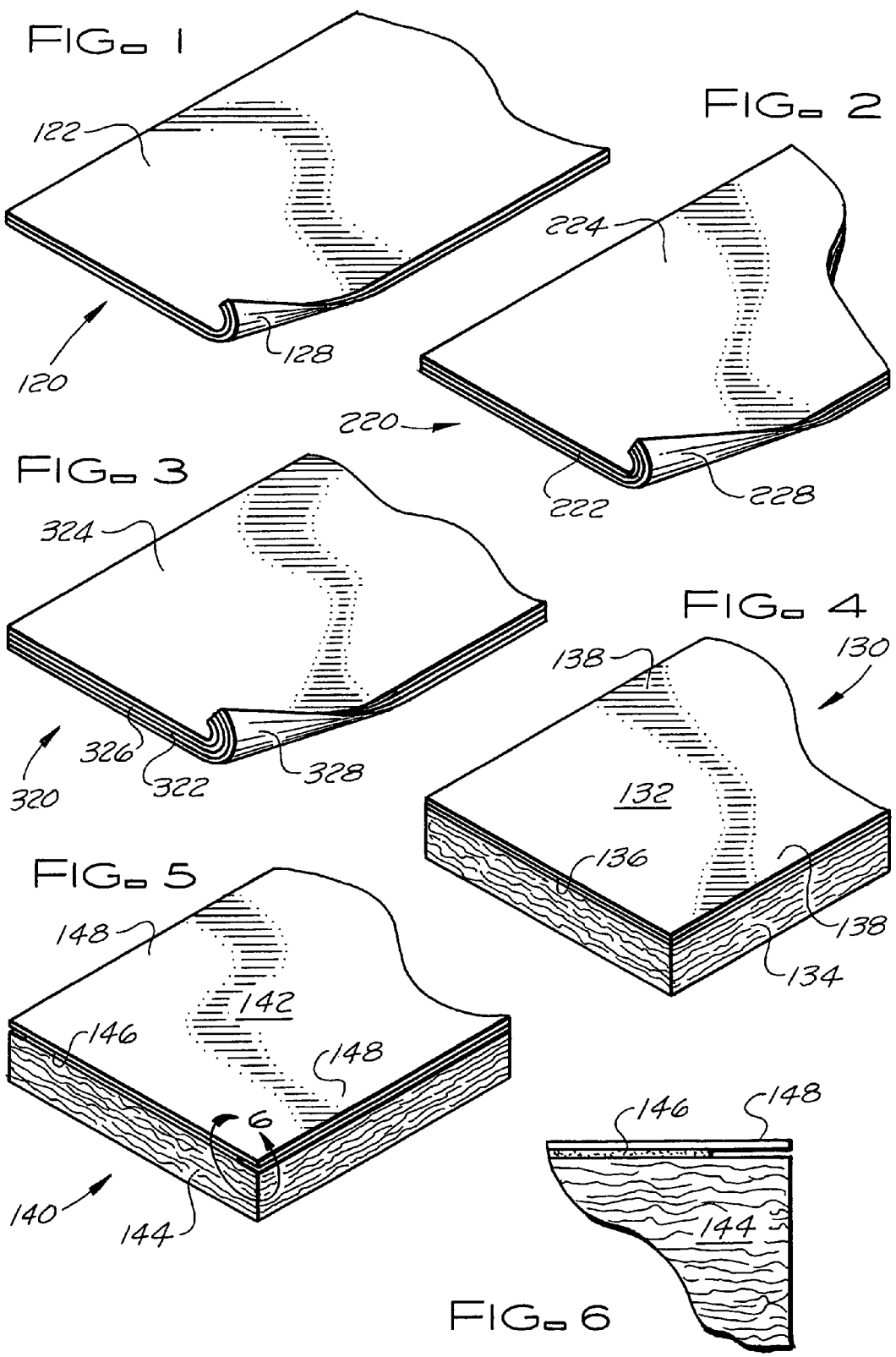

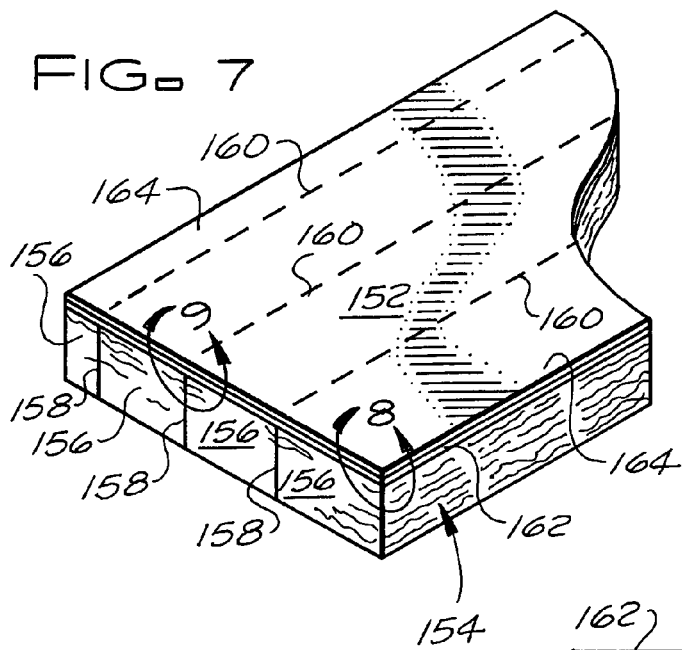
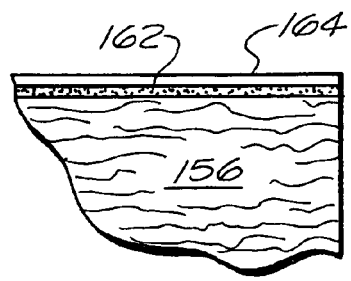
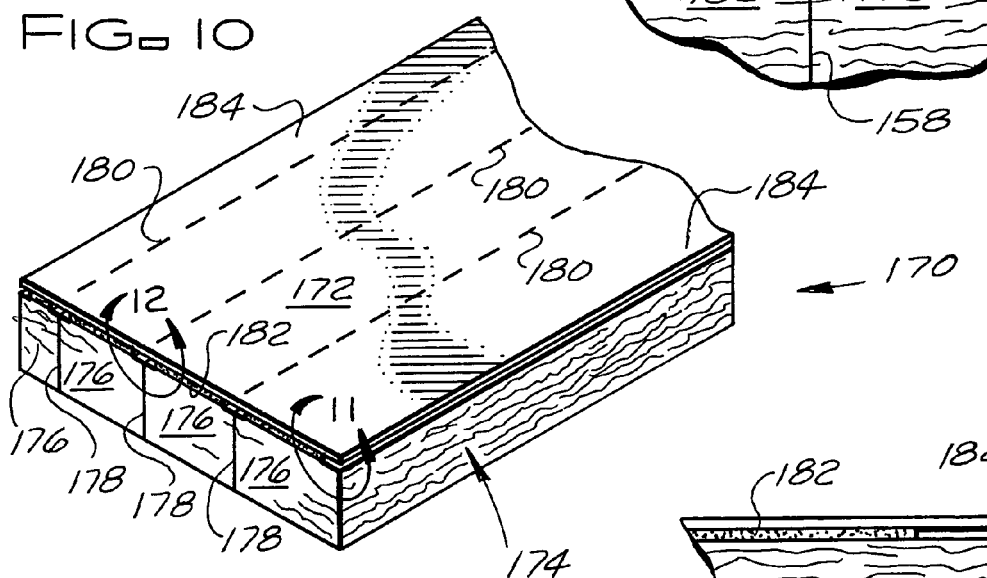
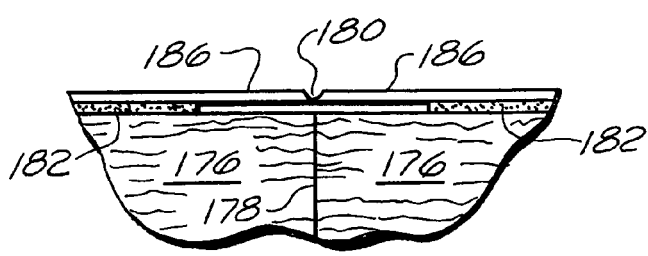

LOW ODOR FACED INSULATION ASSEMBLY

BACKGROUND OF THE INVENTION

The subject invention relates to asphalt coated kraft paper sheet material facings and more specifically, to a low odor asphalt coated kraft paper sheet material facings wherein the asphalt coating layer contains an odor-reducing additive in an amount sufficient to substantially eliminate odor that would otherwise be emitted by the asphalt coating layer without adversely affecting the adherent qualities of the asphalt coating layer. The subject invention also relates to a faced fibrous insulation assembly wherein the asphalt coated facing of the subject invention is bonded to a fibrous insulation blanket that is also odorless or substantially odorless and whose fibers, preferably, are bonded together at their points of intersection with a formaldehyde free binder.

Faced glass fiber insulation assemblies with facings made of kraft paper sheet materials (e.g. kraft papers, foil-kraft paper laminates, or foil-scrim-kraft paper laminates) bonded to major surfaces of glass fiber insulation batts by asphalt coatings have been manufactured and marketed by the glass fiber insulation industry for decades. When these faced insulation assemblies are installed, the facings of these assemblies frequently function as vapor retarders.

Over the decades, the application of the hot asphalt coatings to kraft paper facing materials to produce the asphalt coated kraft paper facing materials has resulted in the release of gaseous emissions with odors that are objectionable to some individuals and that permeate the clothing of the workers at the facing plants manufacturing the kraft paper facing materials. When the hot asphalt coating layers of the asphalt coated kraft paper facing materials are reheated during the application of the asphalt coated kraft paper facing materials to the glass fiber insulation batts at the insulation manufacturing plants to produce faced glass fiber insulation assemblies, gaseous emissions with odors that are objectionable to some individuals and that permeate the clothing of the workers at the insulation manufacturing plants are again released from the asphalt coating layers. To a lesser extent, the presence of the objectionable odors emitted by the asphalt coating layers of the kraft paper faced glass fiber insulation assemblies present a problem in the warehouses and aisles of the retailers where these kraft paper faced glass fiber insulation assemblies are stored and/or sold to contractors and the public. When asked in the past about ways to improve kraft paper faced glass fiber insulation assemblies, professional installers have often cited two items: reduction in the asphalt odor and the elimination of asphalt build up on the knives that they use to cut the insulation assemblies. Yet, in spite of odor-free, hot-mix asphalt compositions that, as evidenced by U.S. Pat. No. 5,271,767, have been known at least since 1993, kraft paper facing materials and kraft paper faced glass fiber insulation assemblies have continued to be manufactured and sold with asphalt coating layers that emit objectionable asphalt odors.

SUMMARY OF THE INVENTION

The asphalt coated kraft paper sheet material facings and the kraft paper sheet material faced fibrous insulation assemblies of the subject invention have solved the problems of current asphalt coated kraft paper sheet material facings and kraft paper sheet material faced fibrous insulation assemblies by providing a kraft paper sheet material facing and kraft paper sheet material faced fibrous insulation assembly with an asphalt layer that has no objectionable asphalt odor, that is otherwise substantially odorless, and that retains its adherent qualities.

The asphalt coated kraft paper sheet material facings of the subject invention have asphalt layers that contain an odor-reducing additive, such as essential plant oil(s), in an amount sufficient to substantially eliminate odor that would otherwise be emitted by the asphalt coating layers without adversely affecting the adherent qualities of the asphalt coating layers and that, preferably, also contain a fungi growth-inhibiting additive.

The faced fibrous insulation assemblies of the subject invention each include: a fibrous insulation batt that, preferably is substantially odorless, such as but not limited to a glass fiber insulation batt whose fibers are bonded together at their points of intersection with a formaldehyde free binder e.g. an acrylic thermosetting binder; a facing that can serve as a vapor retarder to reduce the penetration of water vapor into a wall cavity insulated with the assembly and that is formed by a fungi growth-resistant kraft paper sheet material; and a continuous or semicontinuous asphalt coating layer on an inner surface of the facing that bonds the facing to the fibrous insulation batt and that contains an odor-reducing additive in an amount sufficient to substantially eliminate odor that would otherwise be emitted by the asphalt coating layer without adversely affecting the adherent qualities of the asphalt coating layer. Preferably, the facing with the asphalt coating as applied to the fibrous insulation batt is fungi growth resistant.

BRIEF DESCRIPTION OF THE DRAWINGS

FIG. 1 is a partial perspective view of a first asphalt coated kraft paper sheet material for use in the facings of the subject invention.

FIG. 2 is a partial perspective view of a second asphalt coated kraft paper sheet material for use in the facings of the subject invention.

FIG. 3 is a partial perspective view of a third asphalt coated kraft paper sheet material for use in the facings of the subject invention.

FIG. 4 is a partial perspective view of a first faced insulation assembly of the subject invention wherein the asphalt coating layer is coextensive with or substantially coextensive with the facing and a major surface of the insulation batt.

FIG. 5 is a partial perspective view of a second faced insulation assembly of the subject invention wherein the longitudinally extending lateral edge portions of the facing are not coated with the asphalt coating layer.

FIG. 6 is an enlarged view of the circled lateral edge portion of the faced insulation assembly of FIG. 5.

FIG. 7 is a partial perspective view of a third faced insulation assembly of the subject invention wherein the asphalt coating layer is coextensive with or substantially coextensive with the facing and a major surface of the insulation batt.

FIG. 8 is an enlarged view of the circled lateral edge portion of the faced insulation assembly of FIG. 7.

FIG. 9 is an enlarged view of the circled intermediate portion of the faced insulation assembly of FIG. 7.

FIG. 10 is a partial perspective view of a fourth faced insulation assembly of the subject invention wherein one or more intermediate longitudinally extending portions and the longitudinally extending lateral edge portions of the facing are not coated with the asphalt coating layer.

FIG. 11 is an enlarged view of the circled lateral edge portion of the faced insulation assembly of FIG. 10.

FIG. 12 is an enlarged view of the circled intermediate portion of the faced insulation assembly of FIG. 10.

DESCRIPTION OF THE PREFERRED EMBODIMENTS

FIG. 1 shows a first kraft paper sheet material 120 that may be used for the facing of the subject invention with an asphalt coating layer 128 on its inner surface. The first kraft paper sheet material 120 is formed solely by a kraft paper sheet 122. FIG. 2 shows a second kraft paper sheet material 220 that may be used for the facing of the subject invention with an asphalt coating layer 228 on its inner surface. The second kraft paper sheet material 220 is a foil sheet 224 and a kraft paper sheet 222 bonded together as a laminate. FIG. 3 shows a third kraft paper sheet material 320 that may be used for the facing of the subject invention with an asphalt coating layer 328 on its inner surface. The third kraft paper sheet material 320 is a foil sheet 324, an intermediate scrim sheet 326 and a kraft paper sheet 322 bonded together as a laminate. While the kraft paper sheet materials 120, 220, and 320 are preferred kraft paper sheet materials of the subject invention, it is contemplated that other kraft paper sheet materials including a kraft paper sheet as part of a laminate may be used for the facing of the subject invention.

The kraft paper sheets 122, 222, and 322 used in the kraft paper sheet materials 120, 220, and 320 of FIGS. 1 to 3 are each a bleached or unbleached natural kraft paper sheet (such as but not limited to a 35-38 lbs/3MSF natural kraft paper, a 30-40 lbs/3MSF lightweight kraft paper, or a 35-38 lbs/3MSF extensible natural kraft paper). Preferably, the kraft paper sheets 122, 222, and 322 contain and/or are coated on one or both major surfaces with a fungi growth-inhibiting agent or a blend of fungi growth-inhibiting agents in amounts that result in the kraft paper sheet being fungi growth resistant. As used in this specification and claims the term "fungi growth resistant" means the observable spore growth at a 40× magnification on the surface of a kraft paper sheet material or facing specimen being tested is less than the observable spore growth at a 40× magnification on either a white birch or southern yellow pine comparative specimen when the specimens are tested in accordance with ASTM test method Designation C 1338-00, approved May 10, 2000 and published August 2000. Preferably this kraft paper sheets 122, 222, and 322 exhibit no more than traces of sporulating growth, non-sporulating growth, or both sporulating growth and non-sporulating growth, and more preferably, no sporulating growth or non-sporulating growth when tested in accordance with ASTM test method Designation G 21-96 (Reapproved 2002).

A preferred kraft paper sheet (122, 222, 322) either contains between 200 and 2000 ppm (parts per million), more preferably between 300 and 700 ppm, and most preferably between 400 and 600 ppm of the fungi growth-inhibiting agent 2-(4-Thiazolyl) Benzimidazole (a chemical also known as "TBZ") or is coated on one or both major surfaces with a suspension containing between 200 and 2000 ppm, more preferably between 300 and 700 ppm, and most preferably between 400 and 600 ppm of the fungi growth-inhibiting agent TBZ.

The facings of the subject invention can serve as vapor retarders to reduce the penetration of water vapor into building wall cavities insulated with the faced fibrous insulation assemblies of the subject invention. The facings of the subject invention, formed by each of the kraft paper sheet materials 120, 220, and 320, include the asphalt coating layers 128, 228, and 328, respectively, on the inner major surfaces of facings for bonding the facings to the major surfaces of the fibrous insulation layers of the faced fibrous insulation assemblies of the subject invention. Each asphalt coating layer 128, 228, and 328 has a low temperature softening point, which can be heated, softened, and used to bond the facing to an insulation layer (e.g. a fiberglass insulation layer) without negatively impacting the physical properties or the visual appearance of the facing or otherwise degrading the facing. Asphalt and modified asphalt blends (hereinafter referred to as "asphalt") commonly used in the fibrous insulation industry to bond facings to fibrous insulation layers may be used to form the asphalt coating layers 128, 228 and 328.

Each asphalt coating layer (128, 228, 328) contains an odor-reducing additive in an amount sufficient to eliminate or substantially eliminate odor that would otherwise be emitted by the asphalt coating layer without adversely affecting the adherent qualities of the asphalt coating layer. A preferred odor-reducing additive for use in the asphalt coating layer is an odor suppressant made of essential plant oils, such as but not limited to essential plant oil odor suppressants marketed by Odor Management Inc. of Barrington, Ill. under the trade designations Ecosorb 606SG-3 and Ecosorb 606SG-3AB that supresses, absorbs, and/or neutralizes odor causing gaseous emissions so that the asphalt coating layer is odorless or substantially odorless. When blended with asphalt of the asphalt coating layer at a ratio of 1 part by weight essential plant oil suppressant to 10,000 parts by weight asphalt, the essential plant oil odor suppressants marketed by Odor Management Inc. under the trade designations Ecosorb 606SG-3 and Ecosorb 606SG-3AB substantially reduced and neutralized or substantially neutralized the asphalt odor that would otherwise have been emitted by the asphalt coating layer on the kraft paper sheet material without adversely affecting the adherent qualities of the asphalt coating layer. In addition to the odor-reducing additive, the asphalt coating layers 128, 228, and 328 may include a fungi growth-inhibiting agent such as TBZ and the fungi growth-inhibiting agent may be present in the asphalt coating layer in amounts such as those set forth above for the kraft paper sheets 122, 222, and 322.

While the insulation layer of the faced insulation assemblies of the subject invention may be made of other materials, preferably, the insulation layer of each of the insulation assemblies of the subject invention is a resilient glass fiber insulation blanket made of randomly oriented, entangled, glass fibers that typically has a density between about 0.3 pounds/ft$^3$ and about 1.6 pounds/ft$^3$. Examples of fibers that may be used other than or in addition to glass fibers to form the faced resilient insulation blankets of the subject invention are mineral fibers, such as but not limited to, rock wool fibers, slag fibers, and basalt fibers; organic fibers such as but not limited to polypropylene, polyester and other polymeric fibers; natural fibers such as but not limited to cellulose, wood, flax and cotton fibers; and combinations of such fibers. The fibers in the resilient insulation blankets of the subject invention may be bonded together at their points of intersection for increased integrity, e.g. by a binder such as but not limited to a polycarboxy polymers, polyacrylic acid polymers, a urea or phenol formaldehyde or other suitable bonding material, or the faced resilient fibrous insulation blankets of the subject invention may be binderless provided the blankets possess the required integrity and resilience. However, in a preferred glass fiber insulation blanket used in the faced fibrous insulation assemblies of the subject invention, the glass fibers are bonded together at their points of intersection by a phenol formaldehyde free binder so that the glass fiber insulation blanket is substantially odor free, e.g. an acrylic thermosetting binder such as but not limited the acrylic thermosetting binders disclosed in U.S. Pat. No. 6,331,350, issued Dec. 18, 2001. The disclosure of U.S. Pat. No. 6,331,350 is hereby incorporated herein by reference in its entirety. While the use of formaldehyde binders in fiber glass insulation does not present a health risk, the use of an acrylic thermosetting binder, such as that disclosed in U.S. Pat. No. 6,331,350, rather than the formaldehyde binders typically used in fiber glass building insulations eliminates the emission of formaldehyde, which at higher levels may cause irritation and sensitivity, without degrading the performance of the faced fibrous insulation assemblies of the subject invention. Additionally, these phenol formaldehyde binders typically contain extenders or modifiers, such as urea or other nitrogen containing organic chemicals, which cause these extended or modified binders to generate an undesirable wet diaper like and/or trimethyl amine odor. Unlike these phenol formalehyde binders, the formaldehyde free acrylic thermosetting binders used in the preferred insulation blankets of the faced insulation assemblies of the subject invention are substantially odorless. Therefore, by combining a substantially odor free, acrylic bonded fibrous insulation blanket with a substantially odor free asphalt coated kraft paper facing, a composite faced glass fiber insulation assembly is produced that is substantially odor free.

While the faced resilient fibrous insulation blankets of the subject invention may be in roll form (typically in excess of 117 inches in length), for most applications, such as the insulation of walls in homes and other residential structures, the faced resilient fibrous insulation blankets of the subject invention are in the form of batts about 46 to about 59 inches in length (typically about 48 inches in length) or 88 to about 117 inches in length (typically about 93 inches in length). Typically, the widths of the faced resilient fibrous insulation blankets are substantially equal to or somewhat greater than standard cavity width of the cavities to be insulated, for example: about 15 to about 15½ inches in width (a nominal width of 15 inches) for a cavity where the center to center spacing of the wall, floor, ceiling or roof framing members is about 16 inches (the cavity having a width of about 14½ inches); and about 23 to about 23½ inches in width (a nominal width of 23 inches) for a cavity where the center to center spacing of the wall, floor, ceiling or roof framing members is about 24 inches (the cavity having a width of about 22½ inches). However, for other applications, the faced resilient fibrous insulation blankets may have different initial widths determined by the standard widths of the cavities to be insulated by the insulation blankets.

The amount of thermal resistance or sound control desired and the depth of the cavities being insulated by the faced insulation assemblies determine the thicknesses of the faced insulation assemblies of the subject invention, e.g. faced resilient fibrous insulation blankets. Typically, the faced insulation assemblies are about three to about ten or more inches in thickness and approximate the depth of the cavities being insulated. For example, in a wall cavity defined in part by nominally 2×4 or 2×6 inch studs or framing members, a faced resilient fibrous insulation blanket will have a thickness of about 3½ inches or about 5½ inches, respectively.

FIG. 4 shows a first faced insulation assembly 130 of the subject invention. The faced insulation assembly 130 includes a facing 132 of the subject invention and an insulation layer 134. While the facing 132, shown in FIG. 4, is made of the first kraft paper sheet material 120, the facing 132 may also be made of other kraft paper sheet materials such as but not limited to the kraft paper sheet materials 220 or 320. The facing 132 does not have preformed lateral tabs that can be extended beyond the laterally uncompressed insulation layer 134 for overlaying and/or being secured to framing members defining a cavity being insulated by the faced insulation assembly. Preferably, the insulation layer 134 is made of a resilient insulation material, such as a fiberglass insulation, that can be compressed in the direction of its width, e.g. laterally compressed one or more inches, and that will recover or substantially recover to its initial width after the compressive forces are released. The insulation layer 134 has first and second major surfaces, which are defined by the length and width of the insulation layer, and a thickness. The facing 132 of the faced insulation assembly 130 has a central field portion that is coextensive with and bonded to one of the major surfaces of the insulation layer by an asphalt coating layer 136 that extends to the lateral edges of the facing 132 and the insulation layer 134. With the faced insulation assembly 130 of FIG. 4, if the installer does not desire to form lateral tabs on the facing 132 at the job site that extend laterally beyond the insulation layer 134 when the insulation layer is compressed laterally to fit into a cavity being insulated that is less in width than the faced insulation assembly, the installer merely leaves the lateral edge portions 138 of the facing 132 bonded to the lateral edge portions of the major surface of the insulation layer 134 to which the facing is adhered. However, if the installer desires to form lateral tabs on the faced insulation assembly 130, the installer breaks the bond between the lateral edge portions 138 of the facing 132 and the major surface of the insulation layer to which the facing is adhered and separates the lateral edge portions 138 of the facing from the major surface of the insulation layer 134 to form lateral tabs that extend beyond the laterally compressed insulation layer (e.g. portions about 0.25 to about 1.5 inches in width) for the length of the faced insulation assembly to overlap and/or be secured to the framing members defining the cavity being insulated.

FIGS. 5 and 6 show a faced insulation assembly 140 of the subject invention. The faced insulation assembly 140 includes a facing 142 of the subject invention and an insulation layer 144. While the facing 142, shown in FIGS. 5 and 6, is made of the first kraft paper sheet material 120, the facing 142 may also be made of other kraft paper sheet materials such as but not limited to the kraft paper sheet materials 220 or 320. The facing 142 does not have preformed lateral tabs that can be extended beyond the laterally uncompressed insulation layer 144 for overlaying and/or being secured to framing members defining a cavity being insulated by the faced insulation assembly. Preferably, the insulation layer 144 is made of a resilient insulation material, such as a fiberglass insulation, that can be compressed in the direction of its width, e.g. laterally compressed one or more inches, and that will recover or substantially recover to its initial width after the compressive forces are released. The insulation layer 144 has first and second major surfaces, which are defined by the length and width of the insulation layer, and a thickness. In the faced insulation assembly 140, the asphalt coating layer 146 bonding the central field portion of the facing to one of the major surfaces of the insulation layer 144 does not extend to the lateral edges of either the facing 142 or the insulation layer 144 so that the lateral edge portions 148 of the facing 142 (e.g. portions about 0.25 to about 1.5 inches in width) are not directly bonded to the major surface of the insulation layer to which the facing is adhered. When the insulation layer 144 is compressed laterally to fit between a pair of framing members that are spaced apart a distance less than the width of the faced insulation assembly 140, this structure facilitates the separation of the lateral edge portions 148 of the facing 142 from the insulation layer 144 so that the lateral edge portions 148 of the facing 142 can be extended beyond the lateral surfaces of the laterally compressed insulation layer 144 (e.g. between 0.25 and 1.5 inches) to form lateral tabs that extend for the length of the faced insulation assembly and overlap and/or are secured to the framing members defining the cavity.

FIGS. 7, 8 and 9 show a third faced insulation assembly 150 of the subject invention. The faced insulation assembly 150 includes a facing 152 and an insulation layer 154 that are both longitudinally separable to form faced insulation sections 156 having lesser widths than the faced insulation assembly 150. While the facing 152, shown in FIGS. 7 to 9, is made of the first kraft paper sheet material 120, the facing 152 may also be made of other kraft paper sheet materials such as but not limited to the kraft paper sheet materials 220 or 320. The facing 152 does not have preformed lateral tabs that can be extended beyond the laterally uncompressed insulation layer 154 or any of the uncompressed faced insulation sections 156 for overlaying and/or being secured to framing members defining a cavity being insulated by the faced insulation assembly or one or more of its faced insulation sections. Preferably, the insulation layer 154 is made of a resilient insulation material, such as but not limited to a fiberglass insulation, that can be compressed in the direction of its width, e.g. laterally compressed one or more inches, and that will recover or substantially recover to its initial width after the compressive forces are released. The insulation layer 154 has one or more longitudinally extending series of cuts and separable connectors 158, schematically represented by lines, which enable the insulation layer 154 to be pulled apart or separated by hand into one or more insulation sections 156 of lesser width than the insulation layer 154. For each such series of cuts and separable connectors 158 in the insulation layer 154, the field portion of the facing 152 has a line of weakness 160 therein that is longitudinally aligned with the series of cuts and separable connectors and can be pulled apart or separated by hand. The line of weakness 160 may be formed as a perforated line, as an etched score line that reduces the thickness of the facing along the line, or the line of weakness may be otherwise weakened to facilitate the separation of the facing sheet along the line of weakness.

The insulation layer 154 has first and second major surfaces, which are each defined by the length and width of the insulation layer, and a thickness. The facing 152 of the faced insulation assembly 150 has a central field portion that is coextensive with and bonded to one of the major surfaces of the insulation layer by an asphalt coating layer 162 that extends to the lateral edges of the facing 152 and the insulation layer 154. The facing 152 has lateral edge portions 164 (FIG. 8) adjacent the lateral edge portions of the insulation layer 154 and intermediate portions 166 (FIG. 9) adjacent each of the longitudinally extending series of cuts and separable connectors 158 in the insulation layer 154.

With the faced insulation assembly 150 of FIG. 7 to 9, if the installer does not desire to form lateral tabs on the facing 152 at the job site that extend laterally beyond the insulation layer 154 when the insulation layer is compressed laterally to fit into a cavity being insulated that is less in width than the faced insulation assembly, the installer merely leaves the lateral edge portions 164 of the facing 152 bonded to the lateral edge portions of the major surface of the insulation layer 154 to which the facing is adhered. If the installer does not desire to form lateral tabs on the facing 152 at the job site that extend laterally beyond a narrower faced insulation assembly formed by separating one or more of the insulation sections 156 form the faced insulation assembly 150 to fit into a cavity being insulated that is less in width than the narrower faced insulation assembly, the installer merely leaves the lateral most portions 164 and 166 of the facing 152 bonded the major surface of the one or more faced insulation sections forming the narrower faced insulation assembly. However, if the installer desires to form lateral tabs on the faced insulation assembly 150 at the job site that extend laterally beyond the insulation layer 154 when the insulation layer is compressed laterally to fit into a cavity being insulated that is less in width than the faced insulation assembly 150, the installer breaks the bond between and separates the lateral edge portions 164 of the facing 152 from the major surface of the insulation layer 154 to which the facing is adhered. This procedure forms lateral tabs from the lateral edge portions 164 that extend beyond the laterally compressed insulation layer (e.g. tabs about 0.25 to about 1.5 inches in width) for the length of the faced insulation assembly to overlap and/or be secured to the framing members defining the cavity being insulated. If the installer desires to form lateral tabs on the facing 152 at the job site that extend laterally beyond a narrower faced insulation assembly formed by separating one or more of the insulation sections 156 from the faced insulation assembly 150 to fit into a cavity being insulated that is less in width than the narrower faced insulation assembly, the installer breaks the bond between and separates the lateral most portions 164 and 166 of the facing 152 on the narrower faced insulation assembly from the major surface of the insulation layer 154 to which the facing is adhered. This procedure forms lateral tabs from the facing portions 164 and 166 that extend beyond the laterally compressed insulation layer (e.g. portions about 0.25 to about 1.5 inches in width) for the length of the narrower faced insulation assembly to overlap and/or be secured to the framing members defining the cavity being insulated.

FIGS. 10, 11 and 12 show a fourth faced insulation assembly 170 of the subject invention. The faced insulation assembly 170 includes a facing 172 and an insulation layer 174 that are both longitudinally separable to form faced insulation sections 176 having lesser widths than the faced insulation assembly 170. While the facing 172, shown in FIGS. 10 to 12, is made of the first kraft paper sheet material 120, the facing 172 may also be made of other kraft paper sheet materials such as but not limited to the kraft paper sheet materials 220 or 320. The facing 172 does not have preformed lateral tabs that can be extended beyond the laterally uncompressed insulation layer 174 or any of the uncompressed faced insulation sections 176 for overlaying and/or being secured to framing members defining a cavity being insulated by the faced insulation assembly or one or more of its faced insulation sections. Preferably, the insulation layer 174 is made of a resilient insulation material, such as but not limited to a fiberglass insulation, that can be compressed in the direction of its width, e.g. laterally compressed one or more inches, and that will recover or substantially recover to its initial width after the compressive forces are released. The insulation layer 174 has one or more longitudinally extending series of cuts and separable connectors 178, schematically represented by lines, which enable the insulation layer 174 to be pulled apart or separated by hand into the insulation sections 176 of lesser widths than the insulation layer 174. For each such series of cuts and separable connectors 178 in the insulation layer 174, the field portion of the facing 172 has a line of weakness 180 therein that is longitudinally aligned with the series of cuts and separable connectors and can be pulled apart or separated by hand. The line of weakness 180 may be formed as a perforated line, as an etched score line that reduces the thickness of the facing along the line, or the line of weakness may be otherwise weakened to facilitate the separation of the facing sheet along the line of weakness.

As best shown in FIG. 11, the asphalt coating layer 182 bonding the central field portion of the facing to one of the major surfaces of the insulation layer 174 does not extend to the lateral edges of either the facing 172 or the insulation layer 174 so that the lateral edge portions 184 of the facing are not directly bonded to the major surface of the insulation layer to which the facing is adhered. Preferably, the asphalt coating layer 182 will end from about 0.25 to about 1.5 inches from the lateral edges of the facing 172 and the insulation layer 174 so that the width of each of the unbonded lateral edge portions 184 is between about 0.25 and about 1.5 inches. Preferably, as best shown in FIG. 12, the asphalt coating layer 182 bonding the central field portion of the facing to the major surface of the insulation layer 174 is also omitted from portions 186 of the facing located adjacent each series of cuts and separable connectors 178 in the insulation layer 174 so that the facing is not directly bonded to the insulation layer along each series of cuts and separable connectors 178. Preferably, the asphalt coating layer 182 is omitted for a spacing of about 0.25 to about 1.5 inches from each side of each series of cuts and separable connectors 178 in the insulation layer 174 and the lines 180 of weakness in the facing 172 so that the width of each of the unbonded facing portions 186 is between about 0.25 and about 1.5 inches. The omission of the asphalt coating layer 182 from adjacent the lateral edges of the faced insulation assembly 170 facilitates the separation of the lateral edge portions 184 of the facing from the insulation layer 174 so that the lateral edge portions 184 of the facing 172 can be extended as tabs beyond the lateral surfaces of the laterally compressed insulation layer 174 or extended as tabs beyond the lateral surfaces of compressed insulation sections 176 that have been separated from the insulation layer 174. The omission of asphalt coating layer 182 from adjacent the cuts and separable connectors 178 facilitates the separation of the portions 186 of the facing from the insulation layer 174 adjacent each series of cuts and separable connectors 178 so that the portions 186 of the facing can be extended as tabs beyond the lateral surfaces of the laterally compressed insulation sections 176 separated from the insulation assembly 170.

When the insulation layer 174 of faced insulation assembly 170 is compressed in the direction of its width to fit between a pair of framing members that are spaced a distance less than the width of insulation layer 174, the lateral edge portions 184 of the facing sheet extend as tabs beyond the lateral surfaces of the laterally compressed insulation layer 174 to overlap and/or be secured to the framing members. When one or more insulation sections 176 separated from the faced insulation assembly 170 to form a narrower faced insulation assembly are compressed in the direction of their width to fit between a pair of framing members that are spaced a distance less than the width of the narrower faced insulation assembly, the lateral most portions 184 and 186 of the facing adjacent the lateral surfaces of the narrower faced insulation assembly extend as tabs beyond the lateral surfaces of the laterally compressed narrower faced insulation assembly to overlap and/or be secured to the framing members.

While the faced insulation assemblies of the subject invention have been shown without preformed lateral tabs for overlapping and/or being secured to framing members, the faced insulation assemblies of the subject invention may have lateral tabs extending for the length of faced insulation assembly (e.g. tabs about 0.25 to about 1.5 inches in width) that could be used to overlap framing members defining a cavity being insulated by the faced insulation assembly and/or as a means for securing the faced insulation to the framing members of the cavity being insulated, e.g. by stapling.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:
1. A faced insulation assembly, comprising:
   a glass fiber insulation blanket having a first major surface and a second major surface that are each defined by the length and width of the glass fiber insulation blanket, wherein the glass fiber insulation blanket has lateral edges extending along the length of the glass fiber insulation blanket, wherein the glass fiber insulation blanket comprises at least one longitudinally extending separable connector connecting two adjacent longitudinal sections of the glass fiber insulation blanket;
   a facing formed from a kraft paper sheet material having an outer major surface and an inner major surface, the facing further having lateral edge portions, the lateral edge portions being adjacent to the lateral edges of the glass fiber insulation blanket, wherein the facing comprises at least one line of weakness that is longitudinally aligned with the at least one lonuitudinally extending separable connector; and
   an asphalt coating layer on the inner major surface of the facing that bonds the facing to the first major surface of the glass fiber insulation blanket,
   wherein the asphalt coating layer does not extend to the lateral edges of the glass fiber insulation blanket such that the lateral edge portions of the facing are not bonded to the first major surface of the glass fiber insulation blanket by the asphalt coating layer,
   wherein the asphalt coating layer is not present in regions between the at least one longitudinally extending separable connector and the at least one line of weakness, and
   wherein the asphalt coating layer consists essentially of an asphalt or a blend of asphalts, and an odor-reducing additive of at least one essential plant oil in an amount sufficient to substantially eliminate odor that would otherwise be emitted by the asphalt coating layer without adversely affecting the adherent qualities of the asphalt coating layer.

2. The faced insulation assembly according to claim 1, wherein:
   the odor-reducing additive is at least one essential plant oil that is present in the asphalt coating layer in an amount approximating 1 part by weight of the odor-reducing additive to 10,000 parts asphalt blend.

3. The faced insulation assembly according to claim 1, wherein: the kraft paper sheet material includes a foil layer and a kraft paper layer.

4. The faced insulation assembly according to claim 1, wherein: the kraft paper sheet material includes a foil layer, a scrim layer and a kraft paper layer.

5. The faced insulation assembly according to claim 1, wherein: the kraft paper sheet material of the facing is a fungi growth-resistant kraft paper sheet material.

6. The faced insulation assembly according to claim 1, wherein the lateral edge portions of the facing are about 0.25 to about 1.5 inches in width.

7. The faced insulation assembly according to claim 1, wherein the asphalt coating layer further comprises a fungi growth-inhibiting additive.

8. The faced insulation assembly according to claim 1, wherein the glass fiber insulation blanket comprises glass fibers bonded together at their points of intersection with a formaldehyde free binder that is an acrylic thermosetting binder.

9. The faced insulation assembly according to claim 1, wherein the regions portions of the facing adjacent to the plurality of lines of weakness are about 0.25 to about 1.5 inches in width.

10. The faced insulation assembly according to claim 1, wherein the glass fiber insulation blanket comprises a plurality of longitudinally extending separable connectors each connecting two adjacent longitudinal sections of the glass fiber insulation blanket, wherein the facing comprises a plurality of lines of weakness, and wherein each line of weakness is longitudinally aligned with one of the plurality of longitudinally extending separable connectors.

11. The faced insulation assembly according to claim 10, wherein the asphalt coating layer is not present in each region between the plurality of longitudinally extending separable connectors and the plurality of lines of weakness.

* * * * *